Dec. 12, 1944.    O. G. NELSON    2,364,808
STRAND HANDLING APPARATUS
Filed Oct. 19, 1943    2 Sheets-Sheet 1
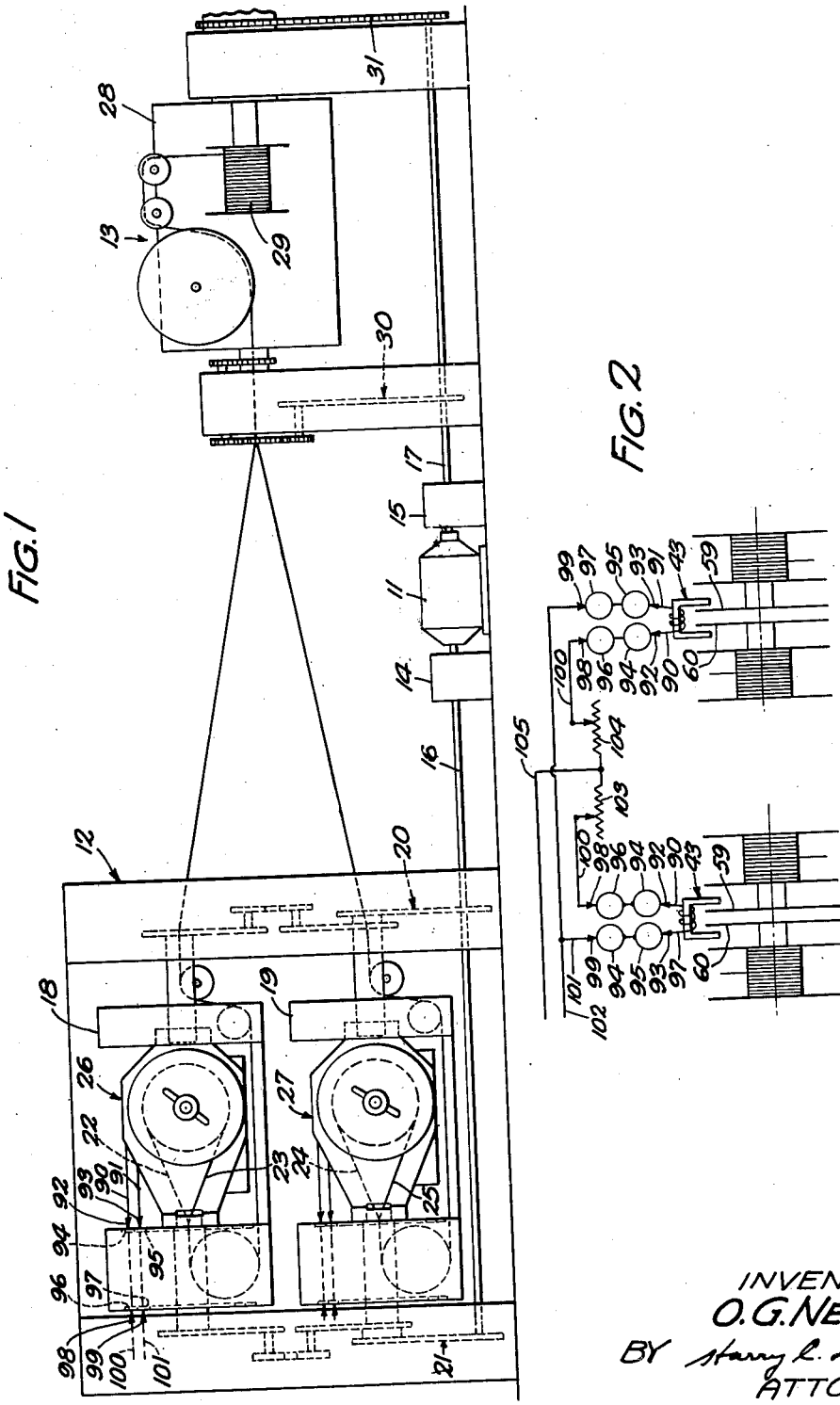
INVENTOR
O. G. NELSON
BY Harry L. Dunft
ATTORNEY

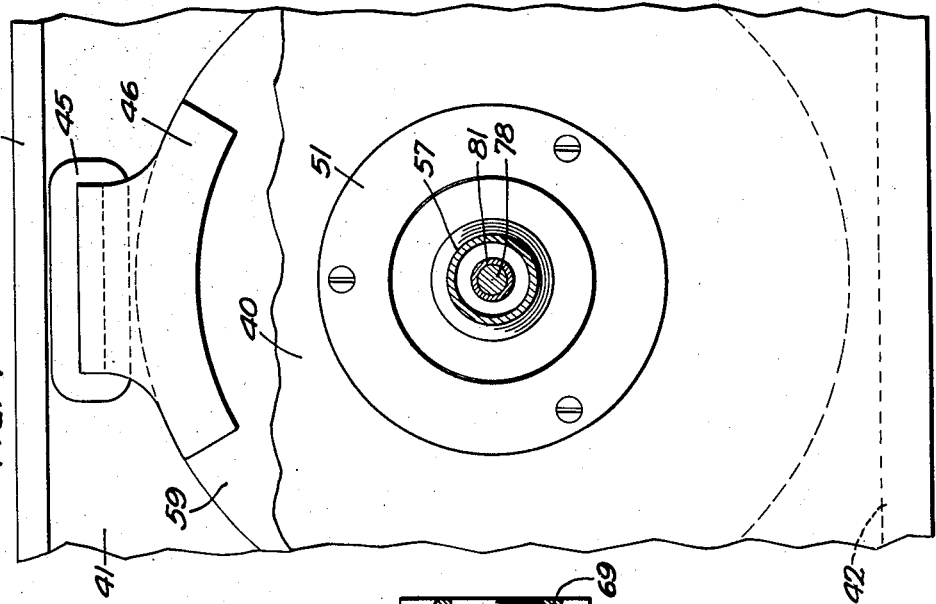
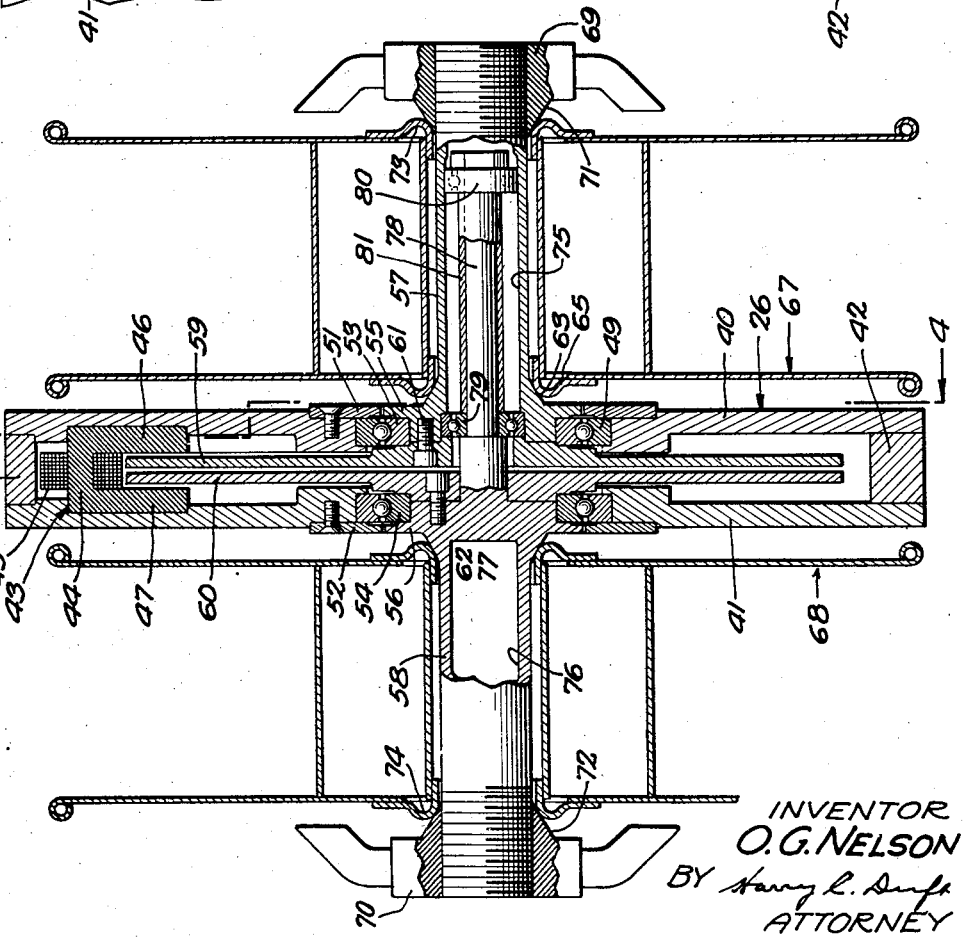

Patented Dec. 12, 1944

2,364,808

UNITED STATES PATENT OFFICE 2,364,808

STRAND HANDLING APPARATUS

Oscar G. Nelson, Baltimore, Md., assignor to Western Electric Company, Incorporated, New York, N. Y., a corporation of New York Application October 19, 1943, Serial No. 506,857

6 Claims. (Cl. 57—60)

This invention relates to strand handling apparatus and more particularly to braking mechanism for twisting machine supply units.

It is an object of the present invention to provide a simple and effective apparatus for controlling the tension in strands.

In accordance with one embodiment of the invention, a strand handling apparatus of the type disclosed in the co-pending application of E. J. Larsen and O. G. Nelson, Serial No. 452,027, filed July 23, 1942, is equipped with a braking mechanism comprising a pair of discs attached to the supply reels of the apparatus and an electromagnet positioned to direct lines of magnetic force through the discs adjacent their peripheries, thereby to apply a braking force tending to retard rotation of the discs. The magnetic flux of the electromagnet may be varied by means positioned externally of the machine to control the braking effect thereof.

A complete understanding of the invention may be had by reference to the following detailed description when considered in conjunction with the accompanying drawings, wherein Fig. 1 is a front elevational view of a strand handling machine constructed to twist conductors into pairs and later twist the pairs together to form a quad;

Fig. 2 is a circuit diagram illustrating schematically the control for the braking mechanism which tends to retard rotation of the supply reels;

Fig. 3 is an enlarged sectional view taken through one pair of supply reels and their associated mechanisms; and Fig. 4 is a vertical sectional view taken substantially along the line 4—4 of Fig. 3 in the direction of the arrows.

In the drawings, Fig. 1 shows somewhat diagrammatically a strand handling apparatus adapted to be driven by a motor 11, which supplies power to two main portions 12 and 13 of the apparatus through gear boxes 14 and 15. Extending from the gear boxes are a pair of shafts 16 and 17 adapted to supply motive power to the two main portions 12 and 13.

As described in detail in the hereinbefore identified application of E. J. Larsen and O. G. Nelson, the main portion 12 of the apparatus includes a pair of flyers 18 and 19 driven through suitable gearing, as shown at 20 and 21, to twist the pairs 22 and 23 and 24 and 25 of wire. The flyers 18 and 19 are adapted to rotate about cradles 26 and 27, which are supported on suitable trunnions and remain stationary while the flyers rotate around them. After the individual pairs of wires 22 and 23 and 24 and 25 are twisted together, they are directed to a flyer unit 28, which twists the pairs of wires together to form a quad, which is then wound upon a takeup reel 29 in the portion 13 of the machine. Suitable gearing 30 and 31 is provided for driving the flyer 28 and takeup reel 29, as described in the aforementioned co-pending application of E. J. Larsen and O. G. Nelson.

The cradles 26 and 27 are of identically the same construction, and only the cradle 26, as shown in Figs. 1, 3 and 4, will be described in detail. The cradle 26 has supporting means or trunnions of the same construction as shown in the copending application of E. J. Larsen and O. G. Nelson and comprises a pair of plates 40 and 41 suitably attached to the trunnions and held spaced apart adjacent their lower ends by a spacer element 42. Positioned between the plates 40 and 41 adjacent their upper ends is an electromagnet, designated generally by the numeral 43, comprising a core portion 44, winding 45 and pole pieces 46 and 47.

The plates 40 and 41 (Fig. 3) are spaced apart at their upper edges by a spacer member 48 and have outer bearing races 49 and 50 mounted on them by means of a pair of annular retainer members 51 and 52, respectively. Cooperating with the outer bearing races 49 and 50 are inner bearing races 53 and 54, respectively, which are clamped between shoulders 55 and 56 on spindles 57 and 58 and cooperating surfaces of discs 59 and 60. The discs 59 and 60 are fixed to the spindles 57 and 58 by machine screws 61 and 62, respectively, and are provided with sloping or tapered surfaces 63 and 64, respectively, against which hub members 65 and 66 of reels 67 and 68 may be wedged by retainer members 69 and 70. The retainer members are threaded to engage the outer ends of the spindles 57 and 58 and have tapered or sloping surfaces 71 and 72 formed thereon for engaging outer hub members 73 and 74 of the reels 67 and 68, respectively.

In order to reduce the weight of the spindles as much as possible, they are hollowed out, as shown at 75 and 76, respectively. The spindle 58 is provided with an extending shaft 77, from which there extends a reduced portion 78, which extends a substantial distance into the hollowed-out portion 75 of the spindle 57 and carries bearings 79 and 80 within the spindle 57. A spacer sleeve 81 is interposed between bearings 79 and 80 to properly position them on the reduced portion 78.

The electromagnets 43 associated with the cradles 26 and 27 may be supplied with energizing current in any suitable manner. One method of conducting current to the electromagnet 43 is shown diagrammatically in Fig. 1, wherein a pair of leads 90 and 91 connected to the electromagnet 43 are provided with brushes 92 and 93, which engage conductor rings 94 and 95 insulatedly mounted on the left-hand portion of the flyer 18 and electrically connected to conductor rings 96 and 97, respectively, which are positioned to be engaged by brushes 98 and 99, electrically connected to leads 100 and 101, respectively.

Since the equipment provided for controlling the rotation of the reels on the cradle 27 is exactly the same as that provided on the cradle 26, similar electrical connections are provided for the cradle 27, which will serve to control the braking effect of the electromagnet 43. The leads 101 from the two electromagnets 43 and connected to a lead 102 running to one side of a source of current and the leads 100 from the electromagnet 43 are connected to the movable elements of rheostats 103 and 104, the windings of which are connected to a lead 105 running to the side of the source of current opposite to the lead 102.

In the operation of the apparatus, after supply reels containing supplies of conductors 22 and 23 and 24 and 25 have been placed on the cradles 26 and 27 and fixed to the spindles 57 and 58 on the cradles, the wire may be passed through the flyers 18 and 19 in the manner described in detail in the aforementioned patent application of E. J. Larsen and O. G. Nelson and may be directed from the flyers 26 and 27 to the flyer unit 28. After the reels 67 and 68 have been mounted in the cradles 26 and 27, motor 11 may be started to form a quad from the pairs of wires 22 and 23 and 24 and 25. In order to maintain the proper tension in the pairs being wound, the rheostats 103 and 104 may be adjusted, thereby to control the amount of current supplied to the electromagnets 43 in the cradles 26 and 27, respectively. The retarding effect of the electromagnet 43 in each cradle, in passing its magnetic flux across the path of rotation of the discs 59 and 60, will be equal in its effect upon the two reels 67 and 68 in each cradle since the reels are free to rotate with respect to each other. Inasmuch as the reels rotate in opposite directions with respect one to the other, the braking effect of the electromagnet 43 on the discs 59 and 60 will place the wires withdrawn from the two reels under equal tension and the tension in the wires being withdrawn from the cradle 26 may be adjusted by means of rheostat 103. Similarly, the tension in the pair of wires being withdrawn from the cradle 27 may be adjusted by means of the rheostat 104, thereby to control the tension of the pairs passing to the flyer unit 28 in the portion 13 of the machine. In this manner, the formation of a quad, to be taken up by takeup reel 29, may be adjusted with a high degree of accuracy.

Obviously, if it is desired to balance or increase the electromagnetic braking effect upon the discs 59 and 60, a plurality of electromagnets like the electromagnets 43 may be provided around the peripheries of the discs.

What is claimed is:

1. In a strand handling apparatus, a pair of supply reels rotatable in opposite directions, means for supporting said supply reels on a common axis, discs attached to the supply reels and positioned between the supply reels, an electromagnet positioned to direct its flux field through the discs adjacent their periphery to retard rotation of the discs, and means for controlling the supply of current to the electromagnet.

2. In a material handling apparatus, a pair of reels for supporting supplies of strand material, means for withdrawing the strand material from the supply thereof, a pair of discs, one attached to and rotatable with each of the supply reels, an electromagnet positioned to direct its flux field transversely of the discs to retard the rotation of the discs and their associated reels, a flyer rotatable bodily around the pair of reels, and means for conducting current through the flyer to energize the electromagnet.

3. In an apparatus for twisting wires to form a cable quad, a pair of cradles each supporting a pair of supply reels for rotation in opposite directions, a disc fixed to each supply reel and rotatable therewith, an electromagnet individual to each cradle and positioned to direct its field of flux through the discs adjacent their periphery, a flyer unit rotatable about each cradle, and control means positioned outside the flyers for controlling the flow of current to the electromagnets.

4. In an apparatus for twisting wires to form a cable quad, a pair of cradles each supporting a pair of supply reels for rotation in opposite directions, a disc fixed to each supply reel and rotatable therewith, an electromagnet individual to each cradle and positioned to direct its field of flux through the discs adjacent their periphery, a flyer unit rotatable about each cradle, control means positioned outside the flyers for controlling the flow of current to the electromagnets, and means extending through the flyers to conduct current from the control means to the electromagnets.

5. In an apparatus for twisting wires to form a cable quad, a pair of cradles each supporting a pair of supply reels for rotation in opposite directions, a disc fixed to each supply reel and rotatable therewith, an electromagnet individual to each cradle and positioned to direct its field of flux through the discs adjacent their periphery, a flyer unit rotatable about each cradle, control means positioned outside the flyers for controlling the flow of current to the electromagnets, and means in each flyer for conducting current from the control means to the electromagnet in the associated flyer.

6. In an apparatus for twisting wires to form a cable quad, a pair of cradles each supporting a pair of supply reels for rotation in opposite directions, a flyer rotatable around each cradle, a disc fixed to each supply reel and rotatable therewith, an electromagnet individual to each cradle and positioned to direct its field of flux through the discs adjacent their periphery, and means individual to each electromagnet for individually controlling the flow of current thereto, said controlling means being positioned outside the flyer and electrically connected through the flyer with the electromagnet.

OSCAR G. NELSON.